United States Patent
Naccache et al.

(10) Patent No.: US 10,795,808 B2
(45) Date of Patent: Oct. 6, 2020

(54) METHOD FOR SECURING AT LEAST ONE MEMORY ZONE OF AN ELECTRONIC DEVICE, CORRESPONDING SECURING MODULE, ELECTRONIC DEVICE AND COMPUTER PROGRAM

(71) Applicant: INGENICO GROUP, Paris (FR)

(72) Inventors: David Naccache, Paris (FR); Remi Geraud, Antony (FR); Hiba Koudoussi, Paris (FR)

(73) Assignee: INGENICO GROUP, Paris (FR)

( * ) Notice: Subject to any disclaimer, the term of this patent is extended or adjusted under 35 U.S.C. 154(b) by 120 days.

(21) Appl. No.: 16/063,028

(22) PCT Filed: Dec. 12, 2016

(86) PCT No.: PCT/EP2016/080684
§ 371 (c)(1),
(2) Date: Jun. 15, 2018

(87) PCT Pub. No.: WO2017/102663
PCT Pub. Date: Jun. 22, 2017

(65) Prior Publication Data
US 2018/0373624 A1 Dec. 27, 2018

(30) Foreign Application Priority Data
Dec. 15, 2015 (FR) ...................... 15 62428

(51) Int. Cl.
*G06F 12/02* (2006.01)
*G06F 21/54* (2013.01)
(Continued)

(52) U.S. Cl.
CPC ........ *G06F 12/023* (2013.01); *G06F 12/1433* (2013.01); *G06F 21/54* (2013.01);
(Continued)

(58) Field of Classification Search
CPC ................. G06F 12/023; G06F 21/566; G06F 2221/2143
See application file for complete search history.

(56) References Cited

U.S. PATENT DOCUMENTS

2005/0144412 A1* 6/2005 Swafford .............. G06F 11/366
711/170
2012/0254995 A1 10/2012 Sallam
(Continued)

OTHER PUBLICATIONS

Chow et al. "Shredding Your Garbage: Reducing Data Lifetime Through Secure Deallocation." 2005. USENIX. 14th USENIX Security Symposium. pp. 331-346.*
(Continued)

*Primary Examiner* — Nathan Sadler
(74) *Attorney, Agent, or Firm* — David D. Brush; Westman, Champlin & Koehler, P.A.

(57) ABSTRACT

A method for securing at least one memory zone of an electronic device. The method includes: detecting deallocation of at least one portion of the memory zone, a so-called deallocated portion; replacing at least one part of the deallocated portion with at least one predetermined instruction, a so-called warning instruction, or at least one combination of predetermined instructions, a so-called warning instruction combination; and marking the deallocated portion.

9 Claims, 2 Drawing Sheets

(51) Int. Cl.
*G06F 21/56* (2013.01)
*G06F 12/14* (2006.01)

(52) U.S. Cl.
CPC .... *G06F 21/566* (2013.01); *G06F 2212/1052* (2013.01); *G06F 2221/2143* (2013.01)

(56) References Cited

U.S. PATENT DOCUMENTS

2014/0095821 A1    4/2014  Yang et al.
2016/0026791 A1*   1/2016  Melski ................... G06F 21/54
                                                            726/25

OTHER PUBLICATIONS

Berger et al. "DieHard: Probabilistic Memory Safety for Unsafe Languages." 2006. ACM. PLDI'06.*
International Search Report dated Jan. 13, 2017, for corresponding International Application No. PCT/EP2016/080684, filed Dec. 14, 2016.
Written Opinion dated Jan. 13, 2017, for corresponding International Application No. PCT/EP2016/080684, filed Dec. 14, 2016.
English translation of the Written Opinion dated Jan. 13, 2017, for corresponding International Application No. PCT/EP2016/080684, filed Dec. 14, 2016.

* cited by examiner

METHOD FOR SECURING AT LEAST ONE MEMORY ZONE OF AN ELECTRONIC DEVICE, CORRESPONDING SECURING MODULE, ELECTRONIC DEVICE AND COMPUTER PROGRAM

CROSS-REFERENCE TO RELATED APPLICATIONS

This Application is a Section 371 National Stage Application of International Application No. PCT/EP2016/080684, filed Dec. 12, 2016, the content of which is incorporated herein by reference in its entirety, and published as WO 2017/102663 on Jun. 22, 2017, not in English.

1. FIELD OF THE INVENTION

The proposed technique relates to protection against the reading or use of residual data in the memory of an electronic device, more particularly within an embedded system having limited computation power.

One application of the invention relates to protection against the taking, by an unauthorized entity, of control over the execution flow of a program when this entity tries to access a deallocated memory zone.

2. PRIOR ART

In present-day operating systems, a very precise management of the segmentation of the memory enables the detection of any attempt to take control of the execution flow of a program. When such an attempt is detected, for example when the instruction pointer goes out of a determined perimeter, an error message is launched and the responsible program is terminated so as to prevent any risk of hacking. This however impacts on the performance of the system.

Thus, a known countermeasure technique used to implement this approach consists in isolating the processes by mediating each access to the memory. The term used then is 'virtual memory'. The operations of translation between the virtual memory and the real memory (called a 'physical' memory) are costly, so much so that a dedicated hardware component is added to carry them out. This is an MMU (or memory management unit) type of unit. Despite these measures, it is possible for a program to have access to "non-initialized memory" that actually contains data belonging to other defunct and potentially strategic programs.

In addition, in the precise case of a restricted operating system (also called a "kernel"), or a real-time operating system (RTOS), it is on the contrary common for all the processes to share a same view of the memory in which the verification mentioned earlier (of translation between virtual memory and physical memory) cannot be carried out. Indeed, if the system is limited in other ways, the additional impact of these countermeasures on performance is no longer acceptable.

By contrast, the absence of such countermeasures opens an attack vector because an unauthorized and malicious entity can not only go out of the memory zones that are reserved for it but also invoke pieces of "dead" program code. In practice, operational constraints are set up to limit risks of attack: the code is written only by well-identified persons, the programs are certified and undergo verification, tests are performed, the device gets blocked if a program is detected, etc. However, in addition to the extra cost dictated by these operational constraints they are nevertheless not infallible and—by error or by malice—incidents can occur, especially in a complex system and in interaction.

There is therefore a need to provide a solution that makes it possible to withstand software attacks aimed at taking control of the execution flow of a program or at reading residual data in a memory of an electronic device, especially when the environment no longer has available countermeasures (for example ARM architectures) or segmentation protection (for example for RTOS environments) while ensuring optimum performance especially for an electronic device having limited computation power.

3. SUMMARY OF THE INVENTION

The invention proposes a novel solution that which does not have all these drawbacks of the prior art, in the form of a method for securing at least one memory zone of an electronic device.

According to the invention the method for securing comprises the following steps:
  detecting a deallocation of at least one portion of the memory zone, called a deallocated portion;
  replacing at least one part of the deallocated portion with at least one predetermined instruction, called an alert instruction, or at least one combination of predetermined instructions, called a combination of alert instructions;
  marking the deallocated portion.

Thus, the invention proposes a novel and inventive solution for the protection of memory zones by implementing a specific technique for the deallocation of memory zones, making it possible especially to detect unauthorized attempts to use a deallocated memory zone.

To this end, the invention provides for the securing of a memory zone by triggering the replacement, upon the detection of a request for deallocation of a portion of this memory zone (or of the entire memory zone), of all or part of the portion of deallocated memory zone by one predetermined instruction or sequence of instructions (intended, as described here below, to trigger an alerting program), and then the marking of the deallocated zone portion so that it is recognized as being a non-priority zone, during a request for allocation, as compared with an unmarked memory zone.

For example, the instruction of the sequence of instructions used, called an alert instruction or instructions, corresponds to a jump instruction towards an alerting program, and the bytes of the deallocated portion are replaced in such a way that any access (write access or read access) to this deallocated portion amounts to launching the alerting program. If a jump instruction is written to a byte, then each byte of the deallocated portion is replaced by this jump instruction. Depending on the size of the jump instruction or of the combination of jump instructions, the bytes of the portion of deallocated memory zone are replaced byte by byte, or are replaced by groups of bytes.

In addition, the marking of the deallocated portion, a technique known per se, is used to inform an operating system of the electronic device, for a future allocation of memory, that this memory zone has been recently deallocated and therefore, to the extent possible, should not be reallocated as a priority. Thus, novel rules of reallocation are defined giving priority to an unmarked memory zone as compared with a marked memory zone according to the invention. It may be recalled that this marking readable and modifiable only by the operating system of the electronic device, and this constitutes additional securing.

According to one particular aspect of the invention, the method for securing comprises a preliminary step for determining the size of the deallocated portion, and:

when the determined size is below a predetermined threshold, the replacing step replaces all the bytes of the deallocated portion by at least one alert instruction or at least one combination of alert instructions, and the marking delivers a secured marked memory zone;

when the determined size is above a predetermined threshold, the replacing step replaces at least the n first and the m last bytes of the deallocated portion by at least one alert instruction or at least one combination of alert instructions, with n and m being predetermined integers greater than zero, and the marking delivers an unsecured marked memory zone.

Thus, according to this embodiment, the steps implemented take account of the size of the deallocated memory zone so as to optimize the processing time while enabling optimal securing of the deallocated memory zone.

To this end, if the size of the deallocated memory zone is below a predetermined threshold (for example 32 bytes), then the replacement step consists in replacing the entire deallocated portion by one or more alert instructions and then marking this portion of deallocated zone as being a secured zone. Indeed, the replacement of 32 bytes by one or more jump instructions for example is rapid and is not detrimental to the working of the electronic device.

By contrast, if the portion of deallocated memory zone is above a predetermined threshold (for example 32 bytes), then it is preferable to defer the total replacement of this memory portion by alert instructions so as not to impair the performance of the electronic device. However, it is useful to start replacing certain bytes, for example a certain number of first and last bytes of the memory portion. Indeed, when it is sought to access a memory zone, there are known ways of searching first of all for the first available bytes, whence the idea of replacing a certain number of first bytes of the deallocated memory zone. Similarly, it is preferable to replace also the last bytes, because a malicious entity capable of controlling the instruction pointer only in an approximate manner would thus be detected (a malicious entity is quite capable of tolerating a situation where a few insignificant instructions are performed before the part of interest to him).

Besides, so long as the bytes of the deallocated portion are not replaced by alert instructions, the deallocated memory portion is marked as being unsecured, in such a way that its allocation is not authorized.

In addition, when the determined size is above a predetermined threshold, the method for securing comprises:

a predetermined number of iterations of the replacement step, the predetermined number of iterations being adapted to replacing all the bytes of the deallocated portion, and when all the bytes of the deallocated portion are replaced, a step for modifying the marking of the deallocated portion delivering a secured marked memory zone.

Thus, according to this embodiment, when the portion of deallocated memory zone is excessively great, several successive steps for replacing these bytes by alert instructions are implemented, in deferred mode, when the device has the time available to do so.

In addition, when all the bytes have been replaced, the marking of the deallocated portion is modified and it is marked as being secured. It then becomes possible, according to the predefined allocation rules, to allocate such a memory zone, but not as a priority over an unmarked zone.

According to one particular characteristic of the invention, the method for securing comprises a preliminary step of writing, to at least one protected memory zone of the electronic device distinct from the memory zone to be secured, of at least one alerting program executed via the execution of the alert instruction or combination of alert instructions.

Thus, according to this embodiment, an alerting program is preliminarily written into the memory of the electronic device, in a specific protected zone, i.e. a zone that is readable and executable but not modifiable, in such a way as to be invoked by any access to the alert instruction or the combination of alert instructions described here above.

In this way, as soon as an access is made to a portion of a deallocated memory zone according to the technique of the invention, the alert instruction or combination of alert instructions is executed and a jump is implemented towards the alerting program, which gets launched automatically.

For example, the alert instruction or the combination of alert instructions corresponds to a jump towards the alerting program.

According to one particular aspect of the invention, the alerting program consists of the generation of an alert of the type comprising at least:
  a sound signal emitted by the electronic device;
  a visual signal emitted by the electronic device;
  a deactivation of at least one part of the electronic device;
  a combination of at least two of the types of alert.

Thus, according to this embodiment, an access to a deallocated memory zone according to the technique of the invention triggers an alert that informs the user of the electronic device that an attempt to access a deallocated memory zone is in progress. For example, the alert consists of the emitting of a sound or visual signal or of the deactivation of all or part of the electronic device, thus putting the user on alert. A combination of several of these types of alerts can of course be implemented.

According to one particular characteristic of the invention, a memory zone marked as being secured can be allocated and a memory zone marked as being unsecured cannot be allocated, and an unmarked memory zone is allocated by priority over a memory zone marked as being secured.

Thus, according to this embodiment, particular rules of allocation can be defined so as to reinforce the securing of a memory zone by the method according to the invention, by prohibiting the allocation of a memory zone that is not totally secured (this is the case where its size is above a threshold and requires deferred iterations of the step for replacing bytes by one or more alert instructions) and by making a zone marked as being secured a non-priority zone relative to an unmarked zone.

In this way, the operating system of the electronic device can implement allocation priorities taking account of different markings defined by the method according to the invention.

The invention also relates to a securing module for securing at least one memory zone of an electronic device, comprising:
  a module for detecting a deallocation of at least one portion of the memory zone, called a deallocated portion;
  a module for replacing at least one part of the deallocated portion by at least one predetermined instruction, called an alert instruction or at least one predetermined combination of instructions, called a combination of alert instructions;

a module for marking the deallocated portion.

Such a securing module is especially adapted to implementing the method for securing as described here above.

This securing module could of course include the different characteristics of the method for securing according to the invention which can be combined or taken in isolation. Thus, the characteristics and advantages of this securing module are the same as those of the method for securing and are not described in greater detail.

The invention also relates to an electronic device comprising a module for securing as described here above.

The invention relates to one or more computer program products downloadable from at least one communications network and/or recorded on a computer-readable support and/or executable by a processor comprising program code instructions for implementing at least certain steps of the method for securing as described here above.

Finally, the invention relates to a computer-readable medium on which there is stored a computer program comprising instructions for the execution of the steps of the method for securing described here above.

4. FIGURES

Other features and advantages shall appear more clearly from the following description of one embodiment of the disclosure, given by way of a simple illustratory and non-exhaustive examples and from the appended drawings, of which:

5. DESCRIPTION

5.1. General Principle

Figure 1:
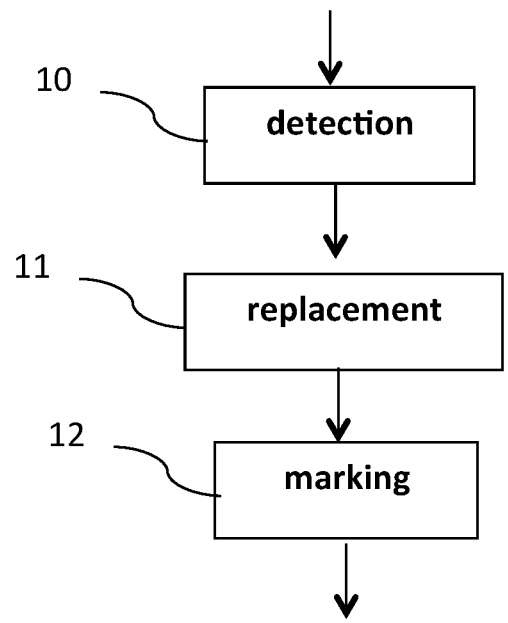
FIG. 1 illustrates the main steps of the method for securing a memory zone according to one embodiment of the invention.

The general principle of the proposed technique is one of modifying the content of the stack and the heap when a memory zone of an electronic device is deallocated so that any access to this deallocated memory zone leads to the launching of an alerting program on the electronic device in question.

The present invention, according to its different embodiments, thus makes it possible to withstand software hacking attempts aimed at taking control over the execution flow of a program or to read residual data when the environment (of the electronic device) has neither countermeasures (for example ARM countermeasures) nor segmentation protection (for example RTOS). The invention therefore provides for protection against the reading or use of residual data in memory, including for devices having limited computation power.

To this end, the present invention according to its different embodiments relies on the following operations:
  the writing, to a protected zone of the memory (i.e. a zone that is readable and executable but not modifiable), of a code segment called a "alerting program". When this program is invoked, it communicates a 'alert state' message to the electronic device or to its user, for example by emitting a sound signal or visual signal and/or by blocking the use of the electronic device;
  the triggering, at each operation of memory release or memory deallocation, of a specific operation of erasure in which all the bytes of this released memory zone are replaced by one or more instructions, called alert instructions, used to invoke the above-mentioned alerting program and then mark this deallocated memory zone;
  defining rules of memory allocation that enable the operating system of the electronic device to limit or to prohibit the allocation of a memory of a marked zone.

5.2 Description of One Embodiment

5.2.1. Alerting Program

The principle of the invention is therefore based on the writing, to a protected memory zone (readable and executable but not modifiable) of the electronic device, of an alerting program to inform the device or its user of an attempt to access a deallocated memory zone in order to resist especially software attacks of the type aimed at taking control of the execution flow of a program or aimed at reading residual data.

As already described here above, the alerting program can for example send out a sound signal or visual signal that is to be perceived by the user of the electronic device in such a way that this user carries out the appropriate measure (for example turning off the electronic device or carrying out an alerting program aimed at deactivating all or part of the electronic device). The alerting program can also deactivate all or part of the functions of the electronic device, temporarily for example, so as to also warn the user of the electronic device while at the same time preventing any malicious entity from achieving its ends.

As described in greater detail here below, this alerting program is invoked through an alert instruction, or a combination of alert instructions, executed as soon as an access to a deallocated zone is requested.

Thus, contrary to known techniques, the invention enables protection against the reading or use of residual data without requiring virtual memory or hardware components dedicated to this securing, thus making it possible to carry out this protection by means of an electronic device having limited computation capacities, such as for example a payment terminal with an embedded system.

5.2.2. Deallocation and Marking

We shall now describe the main steps of the invention with reference to FIG. 1 according to one embodiment of the invention.

The first step 10 consists of the detection of a deallocation, or releasing, of a portion of the memory zone of the electronic device secured according to the invention, hereinafter denoted as a deallocated portion M.

Such a memory deallocation can occur especially in the following situations:
  when a program explicitly asks for the deallocation of a memory zone that has been previously allocated to it;
  when a function ends and when its local variables are erased from the stack;
  when a program terminates its execution for any reason whatsoever. When one of these events occurs, it is detected by the method of the invention and the following steps are implemented:
  the replacement 11 of all or part of the deallocated portion M by one or more alert instructions, denoted as J;

the marking 12 of the deallocated portion M, delivering a marked deallocated portion M, according to two types of marking described here below and denoted as a "secured memory zone" and an "unsecured memory zone".

For example, the alert instruction J is a jump instruction ("jmp") pointing towards the alerting program described here above.

As an alternative, J can correspond to a combination of instructions, the final purpose of which is to launch the execution of the alerting program.

In addition, since the alert instruction or combination of alert instructions J can be written in one or more bytes, the replacement step enables the replacement of each byte by an alert instruction/combination of alert instructions J or the replacement of the groups of bytes by an alert instruction/combination of alert instructions J so that access to any part whatsoever of the deallocation program M executes a jump to the alerting program.

According to a first variant of this embodiment (illustrated in FIG. 2a), the deallocated portion M has a size below a predetermined threshold, enabling it to be integrally replaced by one or more alert instructions J as soon as its deallocation is detected. For example, this threshold depends on the computation capacities of the electronic device and is defined so that the working of the electronic device is not penalized by the implementation of this replacement step. For example, the threshold is fixed at 32 bytes.

Figure 2A:
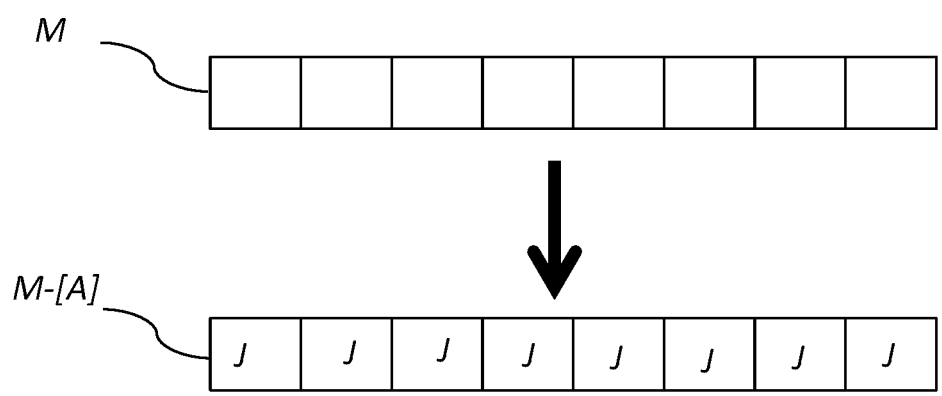
FIGS. 2a and 2b illustrate two examples of a deallocated memory according to two alternative embodiments of the invention.

Thus, according to this first variant, the entire deallocated portion M is replaced by one or more alert instructions J and the deallocated portion M is marked as being a "secured memory zone", or M-[A] as illustrated in FIG. 2a. This marking enables the defining of the secured rules of allocation as described here below.

According to a second variant of this embodiment (illustrated in FIG. 2b), the deallocated portion M has a size above a predetermined threshold, that does not enable it to be entirely replaced by one or more alert instructions J, as soon as its deallocation is detected, without having excessive impact on the working of the electronic device. This second variant then makes it possible to defer a part of the replacement of all the bytes of the deallocated zone M, while at the same time enabling a securing of this zone by the replacement of a certain number of the first bytes (for example n bytes) and a certain number of the last bytes (for example m bytes) of the deallocated zone M. The number of bytes to be replaced during the first replacement step can for example be defined, like the threshold, as a function of the computation capacities of the electronic device so that the working of the electronic device is not penalized by the implementing of this first replacement step. Thus, the first replacement step can, for example, replace the 16 first bytes and the 16 last bytes of the deallocated zone M. It is also possible not to replace the same number of first bytes as last bytes.

In addition, so long as all the bytes of the deallocated zone M are not replaced by alert instructions J, the deallocated zone M is marked as being an "unsecured memory zone" or M-[B] as illustrated in FIG. 2a. Such a marking can for example correspond to a known marking of the "NX" ("Never eXecute") type. As explained here above, the marking is used to define secured allocation rules as described here below.

According to this second alternative embodiment, as soon as the electronic device has the time available to continue and terminate the replacement of the bytes of the deallocated zone M by alert instructions J, replacement steps are implemented as and when the electronic device operates so as to obtain a total replacement of the deallocated zone M. Once this total replacement is done, the marking of this deallocated zone M, which is temporarily marked as being an "unsecured memory zone" or M-[B], is modified to mark the deallocated zone as a "secured memory zone" or M-[A].

5.2.3. Rules of Allocation

As defined here above, the marking of the deallocated memory zones according to the different embodiments of the invention enables the defining of rules of allocation of memory zones reinforcing the securing of these memory zones.

Thus, the operating system, which alone has access to these memory zone markings, takes account of them to respond to a request for memory zone allocation.

Figure 2B:
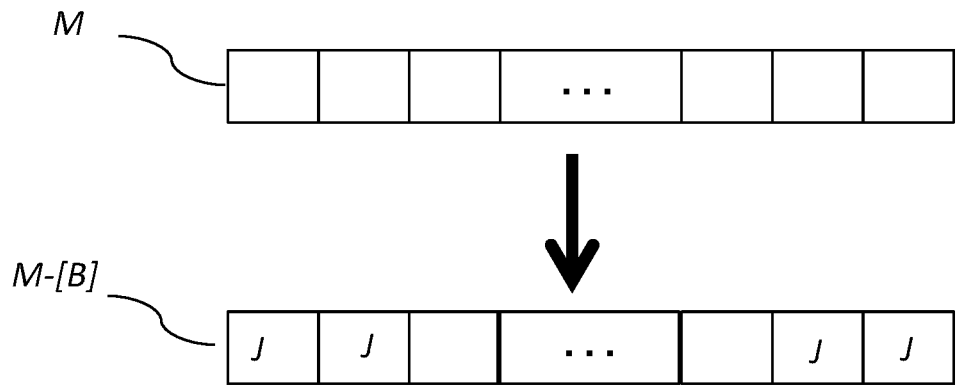

For example, the allocation of a memory zone obeys the following rules:
 the unmarked zones are allocated by priority so as to limit the efficiency of "use-after-free" type attacks which consist in exploiting a vulnerability of certain programs that try to use an object after it has been eliminated. Indeed, when the object has been eliminated whereas the classic deallocation has not erased the corresponding memory, the code of the object is still present in the memory and a malicious entity can (for example with a technique consisting in allocating a maximum amount of memory by small pieces) write to the zone of the object. The victim program then executes the malicious entity's code instead of the object code;
 a zone marked according to the first alternative embodiment described here above, i.e. a zone marked as a "secured memory zone" (or M-[A] as illustrated in FIG. 2a) can be allocated if no marked zone is available;
 a zone marked as an "unsecured memory zone" (or M-[B] as illustrated in FIG. 2b) cannot be allocated, so as the theft of residual information by another program is prevented.

If the operating system and the hardware allow it, the protection can be further reinforced by prohibiting the execution of any instruction situated in a memory zone marked as an "unsecured memory zone" (or M-[B]), i.e. this marking corresponds to a "NX" type of marking.

5.3. Description of One Example of a Securing Module

Figure 3:
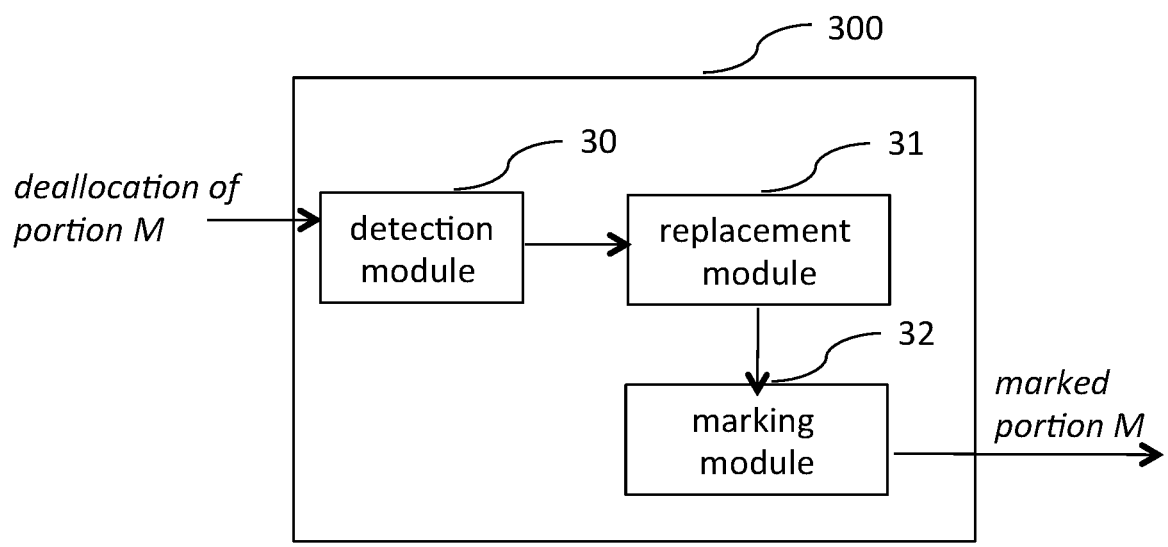
FIG. 3 illustrates an example of a securing module according to one embodiment of the invention.

FIG. 3 finally presents an example of a structure of securing module 300 enabling the implementation of the method of FIG. 1.

According to one embodiment of the invention, a module for securing at least one memory zone of an electronic device comprises:
 a module 30 for the detection of a deallocation of at least one portion of the memory zone, called a deallocated portion M;
 a module 31 for replacing at least one part of the deallocated portion M by at least one predetermined instruction, called an alert instruction J, or at least one combination of predetermined instructions, called a combination of alert instructions;
 a module 32 for marking the deallocated portion M.

FIG. 3 illustrates only one among several possible ways of carrying out the algorithm described in detail here above, with reference to FIG. 1. Indeed, the technique of the invention can be carried out equally well on a reprogrammable computation machine executing a program compris-

The invention claimed is:

1. A method for securing at least one memory zone of an electronic device, wherein the method comprises the following acts:
   detecting a deallocation, when it occurs, of at least one portion of said memory zone, called a deallocated portion;
   in response to the detecting, replacing at least one part of said deallocated portion with at least one predetermined instruction, called an alert instruction, or at least one combination of predetermined instructions, called a combination of alert instructions;
   marking said deallocated portion to deliver a marked memory zone according to different types of marking; and
   a preliminary act of determining a size of said deallocated portion, and:
      when said determined size is below a predetermined threshold, said replacing act replaces all the bytes of said deallocated portion by at least one alert instruction or at least one combination of alert instructions, and said marking delivers a secured marked memory zone; and
      when said determined size is above a predetermined threshold, said replacing act replaces at least the n first and the m last bytes of said deallocated portion by at least one alert instruction or at least one combination of alert instructions, with n and m being predetermined integers greater than zero, and said marking delivers an unsecured marked memory zone.

2. The method for securing according to claim 1 wherein, when said determined size is above the predetermined threshold, said method for securing comprises:
   a predetermined number of iterations of said replacing act, said predetermined number of iterations being adapted to replacing all the bytes of said deallocated portion, and,
   when all the bytes of said deallocated portion are replaced, an act of modifying the marking of said deallocated portion delivering the secured marked memory zone.

3. The method for securing according to claim 1, further comprising a preliminary act of writing, to at least one protected memory zone of said electronic device distinct from said memory zone to be secured, of at least one alerting program executed via execution of said alert instruction or combination of alert instructions.

4. The method for securing according to claim 3, wherein said alert instruction or said combination of alert instructions corresponds to a jump towards said alerting program.

5. The method for securing according to claim 3, wherein said alerting program generates an alert of the type consisting of:
   a sound signal emitted by said electronic device;
   a visual signal emitted by said electronic device;
   a deactivation of at least one part of said electronic device; or
   a combination of at least two of said types of alert.

6. The method for securing according to claim 1, wherein a secured memory zone marked as being secured can be allocated and a memory zone marked as being unsecured cannot be allocated and wherein an unmarked memory zone is allocated by priority over a memory zone marked as being secured.

7. A module for securing at least one memory zone of an electronic device, wherein the module comprises:
   a processor configured to:
   detect a deallocation, when it occurs, of at least one portion of said memory zone, called a deallocated portion;
   in response to detecting the deallocation, replace at least one part of said deallocated portion by at least one predetermined instruction, called an alert instruction, or at least one predetermined combination of instructions, called a combination of alert instructions;
   mark said deallocated portion to deliver a marked memory zone according to different types of marking; and
   preliminarily determine a size of said deallocated portion, and:
      when said determined size is below a predetermined threshold, said processor replaces all the bytes of said deallocated portion by at least one alert instruction or at least one combination of alert instructions, and said processor delivers a secured marked memory zone; and
      when said determined size is above a predetermined threshold, said processor replaces at least the n first and the m last bytes of said deallocated portion by at least one alert instruction or at least one combination of alert instructions, with n and m being predetermined integers greater than zero, and said processor delivers an unsecured marked memory zone.

8. Electronic device comprising the module for securing according to claim 7.

9. A non-transitory computer-readable medium on which there is stored a computer program comprising instructions execution of a method for securing at least one memory zone of an electronic device, when the instructions are executed by a processor, wherein the method comprises:
   detecting a deallocation, when it occurs, of at least one portion of said memory zone, called a deallocated portion;
   in response to the detecting, replacing at least one part of said deallocated portion with at least one predetermined instruction, called an alert instruction, or at least one combination of predetermined instructions, called a combination of alert instructions;
   marking said deallocated portion to deliver a marked memory zone according to different types of marking; and
   a preliminary act of determining a size of said deallocated portion, and:
      when said determined size is below a predetermined threshold, said replacing act replaces all the bytes of said deallocated portion by at least one alert instruction or at least one combination of alert instructions, and said marking delivers a secured marked memory zone; and
      when said determined size is above a predetermined threshold, said replacing act replaces at least the n first and the m last bytes of said deallocated portion by at least one alert instruction or at least one combination of alert instructions, with n and m being predetermined integers greater than zero, and said marking delivers an unsecured marked memory zone.

* * * * *